(12) United States Patent
Covell et al.

(10) Patent No.: US 9,262,545 B2
(45) Date of Patent: Feb. 16, 2016

(54) DISTRIBUTED VIDEO CONTENT MANAGEMENT AND SHARING SYSTEM

(75) Inventors: Andrew Covell, Syracuse, NY (US); Jeremy Patterson, Baldwinsville, NY (US); James Daley, Cazenovia, NY (US); Scott Nadzan, Baldwinsville, NY (US); Michael A. Fudge, Cicero, NY (US); Boyan Kostadinov, Oneida, NY (US); Christopher Sedore, Redfield, NY (US)

(73) Assignee: Syracuse University, Syracuse, NY (US)

( * ) Notice: Subject to any disclaimer, the term of this patent is extended or adjusted under 35 U.S.C. 154(b) by 1283 days.

(21) Appl. No.: 12/018,159

(22) Filed: Jan. 22, 2008

(65) Prior Publication Data

US 2008/0189617 A1 Aug. 7, 2008

Related U.S. Application Data

(60) Provisional application No. 60/886,002, filed on Jan. 22, 2007.

(51) Int. Cl.
*G06F 15/173* (2006.01)
*G06F 3/048* (2013.01)
(Continued)

(52) U.S. Cl.
CPC .......... *G06F 17/3089* (2013.01); *H04L 63/102* (2013.01); *H04L 67/02* (2013.01); *H04L 67/10* (2013.01)

(58) Field of Classification Search
USPC ........................................................ 715/750
See application file for complete search history.

(56) References Cited

U.S. PATENT DOCUMENTS 5,550,982 A   8/1996   Long et al.
5,793,964 A   8/1998   Rogers et al.
(Continued)

FOREIGN PATENT DOCUMENTS

WO   WO0150226    7/2001
WO   WO02057943   7/2002
(Continued)

OTHER PUBLICATIONS

StreamingStar Technology Inc., streamingstar.com/NetworkResources/YouTube.htm, Jan. 2007.*
(Continued)

*Primary Examiner* — Matt Kim
*Assistant Examiner* — Mahelet Shiberou
(74) *Attorney, Agent, or Firm* — Frederick J. M. Price; George R. McGuire; Bond Schoeneck & King, PLLC

(57) ABSTRACT

The present invention relates to a system which enables cooperative rich media content management, sharing, and publishing across a distributed set of Web sites, Web servers, and media servers based on control information in an online database. Media files are housed on any number of heterogeneous media repositories. The system of the present invention is used for managing, sharing, and publishing rich media content including video, images, animations, audio, etc. Authorized viewers access media files through dynamically generated content and media links embedded on Web sites. Content administrators publish media entries to any number of such distributed Web sites, and can set viewer permissions for individual video entries when published on specific Web sites. Content administrators can also dynamically establish media sharing and access relationships.

15 Claims, 14 Drawing Sheets

(51) Int. Cl.
   *G06F 17/30* (2006.01)
   *H04L 29/06* (2006.01)
   *H04L 29/08* (2006.01)

(56) References Cited

U.S. PATENT DOCUMENTS

| | | | |
|---|---|---|---|
| 5,956,716 | A | 9/1999 | Kenner et al. |
| 6,389,473 | B1 | 5/2002 | Carmel et al. |
| 6,473,749 | B1 | 10/2002 | Smith et al. |
| 6,604,135 | B1 | 8/2003 | Rogers et al. |
| 6,651,066 | B2 | 11/2003 | Baxter et al. |
| 6,721,741 | B1 | 4/2004 | Eyal et al. |
| 6,804,674 | B2 | 10/2004 | Hsiao et al. |
| 6,826,594 | B1 | 11/2004 | Pettersen |
| 6,910,049 | B2 | 6/2005 | Fenton et al. |
| 7,043,490 | B2 | 5/2006 | Choy et al. |
| 7,277,985 | B2 | 10/2007 | Boutboul et al. |
| 2001/0037379 | A1 | 11/2001 | Livnat |
| 2002/0156904 | A1 | 10/2002 | Gullotta et al. |
| 2004/0254934 | A1 | 12/2004 | Ho et al. |

FOREIGN PATENT DOCUMENTS

| | | |
|---|---|---|
| WO | WO02103548 | 12/2002 |
| WO | WO2004075094 | 9/2004 |
| WO | WO 2005/048029 A2 | 5/2005 |
| WO | WO2005106692 | 11/2005 |

OTHER PUBLICATIONS

Wikipedia, en.wikipedia.org/wiki/Three-tier_(computing), Dec. 2005.*
Rossum, mail.python.org/pipermail/python-dev/2006-December/070323.html, Dec. 2006.*
Taliver Heath et al., "Energy Conservation in Heterogeneous Server Clusters," 2005.*
Veoh Video Network, "FAQ," Dec. 2006.*
Brian Lam, "How To: Build a Media Server," Feb. 2006.*
Free Streaming Video Service Available for Students on Multiple Department Web Sites—Article by Montmollin from News@DailyOrange.com, Oct. 16, 2006, School of Management.
Presentation at NERCOMP SIG Workshop on Arts and Technology—Disclosure date Feb. 5, 2007.

* cited by examiner

Tables

ENSEMMBLE1\Databases\ensemble\Tables

59 Item(s)

| System Tables | DeptCollectionNames | PublishedVideos |
|---|---|---|
| AccessControl | DeptCustomFields | Ratings |
| Agents | DeptDimensions | RootVideoAuthorizationDefaults |
| Attachments | DeptGenres | SecondSeriesTitle |
| AuthSources | DeptGeographicNames | serviceJobs |
| AuthSourceTypes | DeptPaths | serviceJobsLog |
| Categories | DeptPermissions | serviceJobTypes |
| CustomFields | Encodings | SharedVideos |
| DCAgentRoles | encodingUploads | SubjectCorpNames |
| DCGenRes | GroupMembership | SubjectPersonNames |
| DefaultDeptPermissions | Groups | SubjGeoNames |
| DefaultWebPermissions | Images | TestLogs |
| Departments | Links | Users |
| Departments2 | LogPaths | VideoAuthorizationTickets |
| DepartmentsShares | Logs | VideoCategory |
| DeptAgentRoles | Organizations | VideoCopy |
| DeptBandwidthLabels | OrgPermissions | VideoDate |
| DeptCategories | PageViews | VideoPermissions |

FIG.3

Copy and paste the following code between the <head></head> tags of your HTML.

```
<script language="javascript" src="http://video.syr.edu/plugin/v2/bigllc-xjr.js"></script>
<script language="javascript" src="http://video.syr.edu/plugin/v2/querystring.js"></script>
<script language="javascript" src="http://video.syr.edu/plugin/v2/loadit.asp"></script>
<script language="javascript" src="http://video.syr.edu/plugin/v2/preview.js"></script>
<script language="javascript" src="http://video.syr.edu/plugin/v2/validate.js"></script>
<style type="text/css" media="all">@import url ("ensembleVideo.css");</style>
```

Copy and paste the following into your <body> tag.

```
onLoad="doIt ('456314d4-dde7-4548-a50a-a261e60bdff3','false','false','vertical');"
```

Copy and paste the following into the body of the page, where you want the plug in to appear

```
<div id="vidShow"></div>
```

FIG.7

1200—Viewing/Modifying department share permissions

| Source Department | Copy | Transfer | |
|---|---|---|---|
| Video Production Unit | ☐ | ☑ | Delete |
| iMBA | ☑ | ☐ | Delete |
| Syracuse 1st | ☐ | ☑ | Delete |
| EEE | ☑ | ☐ | Delete |
| EEE 600 | ☐ | ☐ | Delete |
| Doing Business in Africa | ☐ | ☐ | Delete |
| CNY Chinese School | ☐ | ☐ | Delete |
| The Chillmark Companies | ☐ | ☑ | Delete |

Add a New Share

1210—Granting department share permissions

EFE 600

Add to My Shares  Cancel

1220—Authorizing direct publishing

Add to Direct Publishing

| Department | Website Access | |
|---|---|---|
| Video Production Line | Whitman School | Delete |
| — | No Direct Publishing Access | Delete |
| — | No Direct Publishing Access | Delete |
| — | No Direct Publishing Access | Delete |
| — | Whitman School | Delete |
| — | Whitman School | Delete |
| — | No Direct Publishing Access | Delete |
| — | No Direct Publishing Access | Delete |

1230—Checkboxes for department share with no direct publishing

☐

1240—Checkboxes for department share with direct publishing

☐

Websites:
☐ CCC

Categories:
☐ Business Plan Presentations
☐ Research Presentations
☐ Teaching Entrepreneurship to Others
☐ Entrepreneurship Training and Best Practices
☐ Successful Entrepreneurs

FIG.10

| DEPARTMENT | CONTENT ADMINISTRATOR PERMISSIONS | WEB SITE | WEB *PUBLISH* PERMISSIONS |
|---|---|---|---|
| DEPT A | DEPT-A-CONTRIBUTORS: *CONTRIBUTE*<br>DEPT-A-EDITORS: *EDIT* | WEB SITE 1 | DEPT-A-CONTRIBUTORS:*PUBLISH*<br>DEPT-A-EDITORS:*PUBLISH* |
| | | WEB SITE 2 | DEPT-A-CONTRIBUTORS:*PUBLISH*<br>DEPT-A-EDITORS:*PUBLISH* |
| | | WEB SITE 3 | DEPT-A-CONTRIBUTORS:*PUBLISH*<br>DEPT-A-EDITORS:*PUBLISH* |
| DEPT B | DEPT-B-CONTRIBUTORS: *CONTRIBUTE*<br>DEPT-B-EDITORS: *EDIT*<br>DEPT-A-CONTRIBUTORS: *SHARE* | WEB SITE 4 | DEPT-B-CONTRIBUTORS:*PUBLISH*<br>DEPT-B-EDITORS:*PUBLISH* |
| | | WEB SITE 5 | DEPT-B-CONTRIBUTORS:*PUBLISH*<br>DEPT-B-EDITORS:*PUBLISH* |
| | | WEB SITE 6 | DEPT-B-CONTRIBUTORS:*PUBLISH*<br>DEPT-B-EDITORS:*PUBLISH* |
| DEPT Z | DEPT-Z-CONTRIBUTORS: *CONTRIBUTE*<br>DEPT-Z-EDITORS: *EDIT*<br>DEPT-A-CONTRIBUTORS: *SHARE*<br>DEPT-B-CONTRIBUTORS: *TRANSFER* | WEB SITE 7 | DEPT-Z-CONTRIBUTORS:*PUBLISH* |
| | | WEB SITE 8 | DEPT-Z-CONTRIBUTORS:*PUBLISH*<br>DEPT-A-CONTRIBUTORS:*PUBLISH* |
| | | WEB SITE 9 | DEPT-Z-CONTRIBUTORS:*PUBLISH*<br>DEPT-A-CONTRIBUTORS:*PUBLISH*<br>DEPT-B-CONTRIBUTORS:*PUBLISH* |

FIG.11

| CHECKBOXES AVAILABLE TO DEPT-A-CONTRIBUTORS | | CHECKBOXES AVAILABLE TO DEPT-B-CONTRIBUTORS | | CHECKBOXES AVAILABLE TO DEPT-Z-CONTRIBUTORS | |
|---|---|---|---|---|---|
| DEPARTMENTS | WEB SITES | DEPARTMENTS | WEB SITES | DEPARTMENTS | WEB SITES |
|  | WEB SITE 1 |  | WEB SITE 4 |  | WEB SITE 7 |
|  | WEB SITE 2 |  | WEB SITE 5 |  | WEB SITE 8 |
|  | WEB SITE 3 |  | WEB SITE 6 |  | WEB SITE 9 |
| DEPT-B (SHARE) |  | DEPT-Z (SHARE) | WEB SITE 9 |  |  |
| DEPT-Z (SHARE) | WEB SITE 8 |  |  |  |  |
|  | WEB SITE 9 |  |  |  |  |

FIG.12

| CHECKBOXES AVAILABLE TO DEPT-A-EDITORS | | CHECKBOXES AVAILABLE TO DEPT-B-EDITORS | | CHECKBOXES AVAILABLE TO DEPT-Z-EDITORS | |
|---|---|---|---|---|---|
| DEPARTMENTS | WEB SITES | DEPARTMENTS | WEB SITES | DEPARTMENTS | WEB SITES |
| | WEB SITE 1 | | WEB SITE 4 | | WEB SITE 7 |
| | WEB SITE 2 | | WEB SITE 5 | | |
| | WEB SITE 3 | | WEB SITE 6 | | |

FIG.13

| PERMISSION | DESCRIPTION |
|---|---|
| READ | USERS ASSIGNED THIS PERMISSION FOR A GIVEN VIDEO ENTRY CAN VIEW THE METADATA ENTRIES ON A DETAIL PAGE, BUT DO NOT HAVE ACCESS TO THE MEDIA LINKS SO THEY CANNOT VIEW THE AUDIO-VIDEO MEDIA |
| EXECUTE | USERS ASSIGNED THIS PERMISSION FOR A GIVEN VIDEO ENTRY CAN VIEW THE METADATA ENTRIES ON A DETAIL PAGE, AND THEY HAVE ACCESS TO THE MEDIA LINKS SO THEY CAN VIEW THE AUDIO-VIDEO MEDIA |

FIG.14

DISTRIBUTED VIDEO CONTENT MANAGEMENT AND SHARING SYSTEM

CROSS-REFERENCE TO RELATED APPLICATIONS

This application claims priority to U.S. Provisional patent application Ser. No. 60/886,002, filed Jan. 22, 2007, the entirety of which is hereby incorporated by reference.

BACKGROUND OF THE INVENTION

1. Field of Invention

The present invention relates to content management systems and, more specifically, to a system for cooperatively managing, sharing, and publishing rich media content access across an integrated set of media servers, Web servers, and Web sites based on control information in an online database. The system of the present invention is used for managing, sharing, and publishing rich media content including video, images, animations, audio, etc. The system provides Web-based access to media files on any number of heterogeneous media storage repositories, and it enables individual and organizational users of the system to dynamically establish media sharing and access relationships. The system can be used to build and manage departmental, interdepartmental, inter-organizational, and community media resources.

2. Description of Prior Art

On-demand Internet video access has been provided through a number of inventions for many years. In some instances the media is delivered through streaming technology that manages bandwidth between a streaming server and streaming media clients. In other cases, video is downloaded or progressively downloaded from a Web server to media clients. Media clients can be handheld mobile devices, notebook or desktop computers, or television set-top devices, and the like.

In many instances, users access video content by browsing Web pages where links to video content are present. Users click on those links to initiate the connection—whether stream or http download—between media source and media player. Often times the Web pages that provide media links are dynamically created by Web-server programs based on technologies such as Perl, PHP, Coldfusion, ASP, AJAX, and Net. These programs typically read and write meta-data, including links to media files, which are stored in flat file or relational databases. This forms the basis of a number of Web-based multimedia content management systems and mechanisms.

Content management systems that store and retrieve meta-data in a database enable multiple parties to share content and collaboratively develop new content across a network. Web content management systems further enable easy management and dynamic creation of Web pages that provide access to a range of Web content and interactions, including audio and video content. Multimedia content management and sharing systems enable multiple user update, management, and access to streaming and downloadable video content.

Content delivery networks provide effective, scalable management and delivery of Internet multimedia content in the face of the considerable challenges of Internet unicast video media transmission.

Dedicated participatory video portals, such as YouTube, provide individuals with a convenient way to upload and share video content.

While all of these systems and mechanisms are useful and effective for many organizations and individuals, they are tied to monolithic, centrally managed media storage and delivery infrastructures. They also do not support self-organized, cooperative sharing of video media assets across distributed Web servers and Web sites.

As the Internet and server technologies evolve, there is a need to provide easy-to-use and flexible video media management and sharing technology that is not tied to a monolithic infrastructure or to a centrally managed content delivery network. There is also a need and demand for an easy way to manage and share video assets in a distributed, granular, and cooperative fashion, and to provide and restrict access to video content that is hosted across a mix of media hosting platforms. There is a desire by content and Web site owners to dynamically enable video sharing relationships among trusted content providers, and this content needs to be searchable and accessible via a plethora of individual, organizational, and community Web sites.

SUMMARY OF THE INVENTION

In accordance with an embodiment of the present invention, a system is provided which addresses all of the above mentioned needs. In particular, an easy-to-use and flexible content management system for managing, sharing, and publishing rich media content across an integrated set of media servers, Web servers, and Web sites based on control information in an online database is provided. The system of the present invention is used for managing, sharing, and publishing rich media content including video, images, animations, audio, etc. The system also enables cooperative, self-organized media sharing across multiple organizations, with a distributed media infrastructure and distributed viewer search and access via multiple organizational Web sites. Massive amounts of niche-oriented organizational and participatory media content can be effectively delivered to large numbers of concurrent users via a growing and very diverse infrastructure of relatively inexpensive servers and high-speed Internet connections.

In accordance with an embodiment of the present invention, a system comprising a distributed meta-data content management system that supports cooperative management of diverse video content repositories across a heterogeneous hardware infrastructure is provided. End-user video access is enabled through interactions with distributed Web pages where viewers can browse, sort, search, and view video content entries as well as access downloaded or streamed video content. Public, shared, and restricted Web-based access to Internet video content based on video access restrictions and sharing relationships, defined in the system, for organizations, departments, groups, and individuals is provided. These entities can represent individual content producers, informal groups of individual content producers, non-profit agencies, government agencies, educational institutions, businesses, film and video media companies, local/regional/national/international communities, consortia, virtual communities, and any other imaginable assemblage of individuals and organizations that needs or desires to organize, catalog, and restrict/share access to Internet video content via one or more Web sites in a cooperative manner.

In accordance with an embodiment of the present invention, media file meta-data content can include file name, file location, format, and other details specific to a media file. Catalog content can describe a media entry, which can be associated with multiple media files (different versions of the same source media in different formats), and includes title, description, copyright, and other details specific to the media entry.

The system leverages the ability to provide streaming and progressive download access to video content as is known to those skilled in the art. The system also leverages the ability to integrate Web server programming environments with database systems to dynamically create distributed Web pages that can provide global, intuitive access to diverse Internet video resources. The Web pages that provide such user access can be served by multiple distributed, heterogeneous Web servers. Each video-enabled Web page can provide search, browse, sort, and retrieval functions across a growing collection of video content entries.

In accordance with an additional embodiment of the present invention, a Web-server video content management software (e.g., under the trade name Ensemble Video) is provided that resides on one or more Web and database servers. This Web server software is capable of reading and writing media-data from/to a control database server and to read and write video media files to one or more media content repositories.

The control database is the repository of information about media, users, viewers, Web sites where content is published, and so forth. This includes metadata that details all video assets being managed by the system as well as control information that determines how the system functions in terms of system access and organization and the publishing, management and sharing of video content.

Distributed Web pages provide end-user access to video content via code fragments embedded in HTML pages, frames or table cells. These code fragments interact with the user, and are operable to allow the user to retrieve and format metadata from the control database through the video content management system software of an embodiment of the present invention.

The highest level aggregation of users and content entries within the system is the organization. "Organizations" are comprised of one or more "departments" which owns and manages a set of content entries via content administrators. An organization administrator defines the various departments in an Organization and creates content administrator user accounts which are associated with a single department. The content administrators can be a person that can log into a shared Web server that has the video content management system software, which enables them to upload, catalog, manage, and share video content.

In accordance with a further embodiment of the present invention the system provides for centralized or distributed video media management for organizations and departments.

The system can accommodate Application Service Provider functionality in conjunction with shared, centralized, and or distributed video content hosting.

For example, a media hosting company can implement the video content management software and control database of an embodiment of the present invention in a centralized fashion to provide video management and access to multiple subscribing companies which do not have their own in-house media repositories. In this case, one "organization" is created for each subscribing organization, and each organization has one or more departments where each "department" corresponds to a content owner within the subscriber organization. The department owns and manages a set of content entries.

Another example, would be a community implementation where the organization is a consortia of small local community agencies which are authorized to upload, manage, and share content through the video management system, a central shared media storage infrastructure, and a single control database. A "department" in this case would be each community agency that uses this centralized and shared community system.

A local hosting option is also an option, where individual content owner groups, e.g., "departments," run the content management software of an embodiment of the present invention on their departmental Web servers. Departmental video content administrators can log into the system to create, catalog, and manage video entries, upload video content directly to a department media server, publish video content to a website, and specify video entry access restrictions and sharing. The departmental Web server with the content management software of an embodiment of the present invention is connected to a shared organizational control database, which can be housed on a separate server that enables sharing of video content with other departments and department Web sites within the organization or in other organizations that use the system via the same control database.

A Web-based interface is provided, called the Contributor Interface, which enables content administrators to catalog, upload, share, and publish (manage access to) video content. The interface is provided with Wizards for adding and editing individual video entries. The interface includes a "video edit listing" which is a complete list of videos owned by a particular department. The interface also includes electronic forms where content administrators can specify how video entries are shared with cooperating departments and how they are published on departmental and shared Web sites. The interface also has a section for managing access to "Shared videos," a Transfer interface, and a Copy function that enables content administrators to copy video entries from one department to another.

In accordance with an additional embodiment of the present invention, a module (e.g., a video management service) that is able to move large video files around an organization, or between organizations, is a component of the Web application that can move, copy, or delete video files on one or more video media servers that comprise a distributed heterogeneous media infrastructure. This module imparts a desired flexibility to the system of an embodiment of the present invention, enabling the system to write to a wide range of media storage infrastructures in a very flexible, configurable fashion. This includes Windows SMB share, Active Directory authenticated access, Samba share to Linux or Unix server, ftp, sftp, proprietary UDP transfer mechanisms, and other protocols and copy mechanisms—available across LAN, MAN, WAN, or the Internet—suitable for the transmission of large video files. This module is configurable so that video transmission can be immediate or delayed and transmitted when network traffic is reduced (e.g., during off-peak hours).

In accordance with a further embodiment of the present invention, interdepartmental sharing, access, and control of video content is determined by a set of sharing relationships among and between organizations and departments of an embodiment of the present invention. System administrators and content administrators of an embodiment of the present invention define these relationships as needed to support evolving sharing needs and requirements.

A department defines one or more Web sites where the department can publish its video entries. This occurs when a code fragment of an embodiment of the present invention is embedded in a Web site. The code fragment interacts with the software of an embodiment of the present invention which retrieves video meta data from the control database (based on a unique Web ID in the control database) and then transmits to the code fragment the retrieved video meta data—including catalog information, preview and thumbnail images, links for viewing video media, etc. The code fragment interacts with the viewer and the software content management system in this way to create an interactive, searchable video viewer interface with metadata and media links embedded for viewing access. Each department Web site defined in an embodiment of the present invention is assigned a unique Web ID which links the requests from the embedded code fragment with video entries that have been "published" to that Web site.

For each department there are one or more content contributor user accounts that permit department content administrators (content administrators with "contribute permission") to login in and create and manage video content entries, and publish video content entries to the department Web sites. One or more content editor user accounts that enable department content administrators (content administrators with "edit permission") to login and edit video entries and publish them to departmental Web sites, can be created.

A set of permissions associated with content administrator user accounts determine how content administrators manage and share video content within an organization and with departments in other organizations. Departmental content administrators may have Contribute or Edit permissions. Departmental content administrators who have Contribute permissions (known as content contributors) have full access to administrative controls for the department. Departmental content administrators with Contribute permissions can create, edit, and delete video entries and associated meta-data, and upload video content. These content contributors also have, by default, Publish permission for all departmental Web sites, which enables them to specify on which departmental Web sites video content is accessible. Further, these content contributors are able to configure special settings that customize Web sites, Web site categories, HTML embed options, and various catalog select options or default values (e.g., genre, copyright, etc.). Departmental content administrators who have Edit permission (known as content editors) can edit video content entries and associated meta-data, and share video content entries. These content editors also have, by default, Publish permissions for all departmental Web sites.

Share, Copy, and Transfer permissions can be assigned to departmental content administrators when there is a desire to share content from one department to another.

The system enables any source department to permit any other receiving department's content administrators the ability to Share video entries so that they appear on a "shared videos" listing for the receiving department, and can be published to one or more receiving department Web sites. Source department content administrators retain exclusive edit control over the video entry and associated meta-data (A single video entry has a variety of associated catalog fields (based on, e.g., Dublin Core Metadata), and the video entry can have one or more encoded video files in one or more industry-standard formats.).

The system also provides the source department with the ability to enable Publish permission(s) for department content administrators from another department that have been granted Share permissions, so that source department content administrators can directly and immediately publish content entries to one or more receiving department Web sites. In this instance, no intervention from a receiving department content administrator is required for an entry to be published on the receiving department's Web site. In this scenario, in accordance with an embodiment of the present invention, a shared or transferred video entry is "live" on the recipient Web site (i.e., published to the Web site where it is immediately accessible to viewers) as soon as the source/contributing department finalizes the entry.

The system also enables any department's content contributors the ability to permit another department's content contributors the right to Copy a video entry, so that upon copying, a complete copy of the video entry is available on the video edit listing for the receiving department's content contributors and content editors. The receiving department's content administrators "own" the copied video entry. They can edit the video entry meta-data and publish and share the copied video entry. The contributing department, however, maintains the original source video entry which continues to be available to source department's content contributors and content editors.

Additionally, the system enables a given source department's content contributors the ability to Transfer video entries to a receiving department's content contributors and content editors (this is useful when a department routinely creates video content for other department—i.e., a video production unit or video encoding department). Transferred video entries appear on the receiving parties video edit listing post-transfer. The receiving content contributors and content editors are granted exclusive edit control over transferred video entry meta-data; and contributing department's content contributors and content editors relinquish control over, and access to, the video entry meta-data and control information. Transferring a video entry uploads the video media files directly to the media server location of the receiving department. The transferring department does not retain a copy of the video entry in its edit video listing and the media is not copied to its media repository.

A system administrator(s) control(s) the settings across a single implementation comprising one or more Web servers with Web server software, a shared control database, and one or more shared remote media servers. Organization administrators can administer the departments and users within their organization.

The system provided also can be configured such that two installations of the embodiment of the present invention, which are organized and controlled by separate control databases, can be integrated. A department within one organization (with a dedicated control database) can share video meta-data and content with a department in another organization (which has its own dedicated control database), and can also publish content to a Web site which belongs to a department in that other organization. This requires database replication or mirroring between the control databases of the cooperating organizations of an embodiment of the present invention. A file-transfer based inter-system import/export process (e.g., utilizing XML files) can also be implemented to move media and meta-data between cooperating organizations and departments on disparate control databases. The system has a defined set of fields which are replicated, where replication is used instead of mirroring or file-based methods. System administrators collaborate to implement replication, mirroring, or file-based inter-system processes when video sharing across organizations with disparate control databases is required.

In accordance with an additional embodiment of the present invention, user groups are provided which act as a convenient vehicle for assigning view permissions to multiple individuals.

"Public" is a special default user group. This group includes all users of any video content access Web site of an embodiment of the present invention who are not logged into the system, and thus have no group affiliations of an embodiment of the present invention. A default user group for each organization consists of all users who are affiliated with that organization. A default user group for each department consists of all users who are affiliated with that department.

There is a user group for each organization and department, and each user on the system is associated with a single organization and department. System administrators have the ability to create other user groups, including custom user groups, as needed or desired. These groups can be assigned access permissions by content administrators, enabling system and content administrators to manage access to video entries and video streams. System administrators can create user accounts for users of video content that include a username, password, organization, and department. Each user account is affiliated with only one department and one organization.

In accordance with a further embodiment of the present invention, departmental content contributors and editors can assign Read or Execute end-user viewer access permissions to Public, or one or more users or groups when publishing a video entry to a Web site. Read access enables authorized viewers to view the meta-data content in search, listing, and detail Web pages (catalog information and preview images/animations for the entry), but the links to view/access the video media are unavailable. Execute access gives authorized viewers full access to meta-data in search, listing, and detail Web pages (catalog information and preview images/animations for the entry), and the ability to view/access the video media (the video media links are live and exposed). Default Read and Execute permissions can be established for all the video entries managed by all content administrators for a given department's Web sites. If no default access restrictions are defined for a Web site, and a departmental content contributor or content editor does not explicitly define any restrictions, video entries are published with Public-Execute permissions. Read and Execute access can be applied to any group to restrict or provide full access to video entries.

In accordance with a further embodiment of the present invention, security architecture and mechanisms, such as viewer/user authentication and a media security module, are provided.

User authentication can be handled via any standard Web page security mechanisms, for example, where a Web server is already tied to organizational Lightweight Directory Access Protocol ("LDAP"), Active Directory, or other identity management solutions. A user and group authentication mechanism based on an internal username database is also provided. The LDAP integration security mechanism may be added into the security architecture, so that organizations may use the system and implement viewer and content administrator authentication using an enterprise LDAP repository.

A media security module is also provided which can be used with various media servers including Windows Media servers and the like. Access to various media server content can be controlled through the media security module. When the media security module is implemented, a Web based code-fragment for embedding video access in a Web page writes an "authorization ticket" to the control database every time a page of media links is generated and transmitted to a viewer. This "authorization ticket" is a set of variables written to the control database that may include: media files included in the links on the viewer access page, the IP address of the requesting viewer, and the length of time that this IP address can access the media files indicated in the "authorization ticket". When the media server receives a media request, it checks the control database to see if the requesting IP address has been authorized to view the media file. The media server will only stream the content if a valid authorization is available. If any of the variables—IP address, media file, and time to live—are not valid, the media security module returns "401 Access Denied" to the user's media player.

Additional variables for the authorization ticket may be specified to further extend content security. For example: an IP address range of authorized viewer IP addresses to limit viewer access; the IP address of the Web server where the content was embedded (to prevent embedding the content on other Web servers that would enable un-authorized viewer access); the Uniform Resource Locator for the Web site where the video content is published (to prevent embedding the content on any other Web pages, including those on the same server, that would enable un-authorized viewer access).

The media security module ensures that only authorized users can view video media content. If an authorized user copies a media link and emails it to a friend, for example, that user will be denied because a proper authorization ticket for that user would not exist in the control database. With this mechanism, organizations can be reasonably assured that if they lock down access to a Web site where video content is published, only those individuals who actually view that Web site to access media links will be able to access the video media linked there. With the media security module, organizations can choose to secure viewer content pages with any number of Web page security mechanisms (e.g., Web server security, course management system security, or particular users and user groups) and know that only viewers with access to secure pages will be able to stream the protected video media managed content.

BRIEF DESCRIPTION OF THE DRAWINGS

The present invention will be more fully understood and appreciated by reading the following Detailed Description in conjunction with the accompanying drawings, in which:

FIG. 3 is a screen shot from an embodiment of the present invention showing the tables in the control database.

FIG. 7 is a screen shot from an embodiment of the present invention showing a sample code fragment and instructions for embedding video metadata and links into a Web page.

FIG. 10 shows interface elements in an embodiment of the present invention that illustrate the ability for content administrators to specify and manage content sharing (i.e., Share, Transfer, and Copy) and direct publishing among and between organizations and departments.

FIG. 11 is a table illustrating an embodiment of the present invention, which shows Contribute, Edit, and Share permissions and Web site Publish permissions.

FIG. 12 is a table illustrating an embodiment of the present invention, which shows departmental content contributor permissions.

FIG. 13 is a table illustrating an embodiment of the present invention, which shows departmental content editor permissions.

FIG. 14 is a table illustrating an embodiment of the present invention, which details the types of end-user viewer permissions that can be assigned by content contributors and editors to video entries.

DETAILED DESCRIPTION

Figure 1:
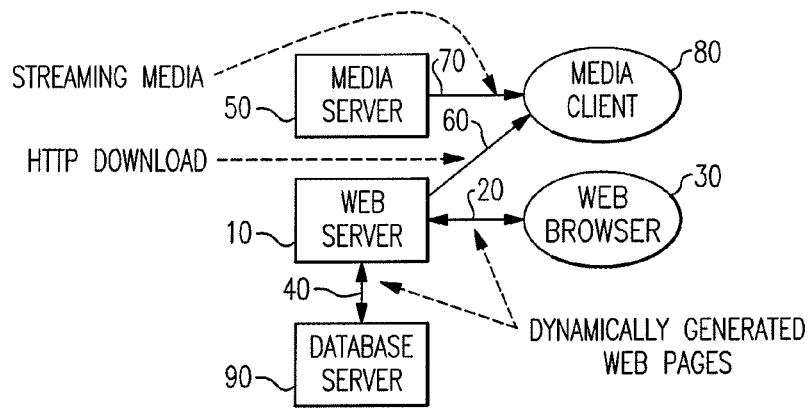
FIG. 1 is a diagram illustrates technological components of streaming, http download, and Web-server-based dynamic Web page creation, based on an underlying database, according to an embodiment of the present invention.

The present invention will be more fully understood and appreciated by reading the following Detailed Description in conjunction with the accompanying drawings, wherein like reference numerals refer to like components.

FIG. 1 is a diagram illustrating some of the technological components of an embodiment of the present invention. Web servers 10 provide Web pages 20 to end users who have Web browser software 30 and Internet connections. In addition to providing static Web pages, Web servers 10 are equipped with scripting/programming technologies such as Perl, PHP, Coldfusion, .NET, etc. These software tools can be programmed to store and retrieve information from external databases such as MySQL, MS-SQL, and Oracle databases. Web-server-based software residing on the Web server 10 can dynamically generate Web pages based on user input parameters and variable data generated by the system environment, or retrieved from a database via database calls 40 to a local or remote database management system 90.

Also, as shown in FIG. 1, the dynamically created Web pages 20 can include links to video media content. When users click on those links in the Web page 20, a media player "helper application" is initiated on the client device and it connects the client device directly with media content stored on the Web server 10 or on a dedicated media server 50. The video media is transferred to the media client 80 (via http download 60 or streaming media 70) where it is viewed by the end-user media client 80.

Figure 2:
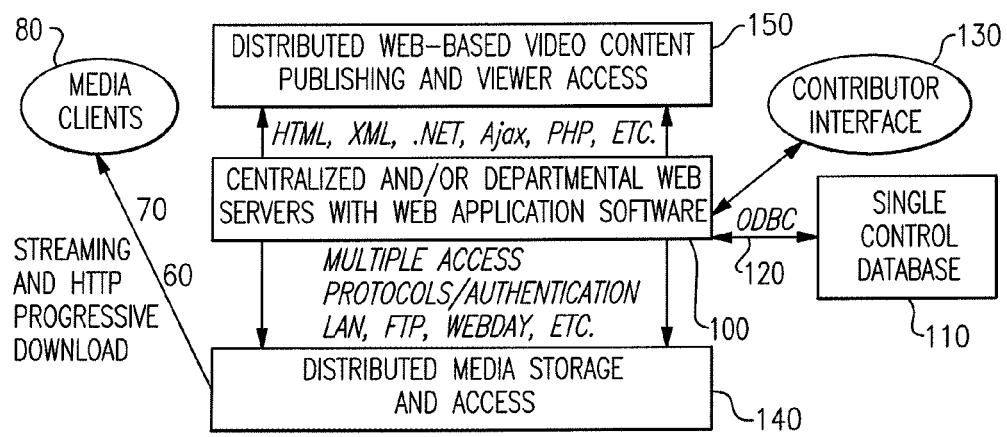
FIG. 2 is a diagram illustrating the encapsulation of an embodiment of the present invention in a middle layer between Web browser and media storage/delivery infrastructure.

FIG. 2 is a diagram illustrating an embodiment of the present invention, which shows the encapsulation of an embodiment of the present invention in a middle layer between Web browser and media storage/delivery infrastructure. The system comprises a Web-based video content management/Web application software (Web application 100) on one or more Web servers (centralized and/or distributed Web servers). Video media that is managed by the system can be stored in a heterogeneous mix of central and departmental (or remote) media servers (distributed media storage and access 140), and access can be provided to a number of distributed Web pages (distributed Web-based video content publishing and viewer access 150). The system comprises a shared control database 110, which contains the locations of stored video media files and has detailed information that catalogs video media entries. The control database also contains control information that defines the organizational structure and users of the system, specifies all the Web sites where metadata and video media links of an embodiment of the present invention will be accessible, specifies the sharing relationships that exists between organizational units, specifies access restrictions, etc.

The control database 110 has tables and fields which together define the components of the system including organizations, departments, Web sites, usernames and passwords, groups, content administrator and viewer permissions, video entries, encoded video files, catalog information, media server directories, Web sites with embedded content, Web site categories, etc. (See FIG. 3, which illustrates a screen shot listing some of the tables in a control database, according to an embodiment of the present invention.).

Web-server software 100 reads and writes all meta-data, user information, publishing specifications, etc., in a control database 110. Multiple servers with Web-server software 100 can be used to upload and manage content on multiple heterogeneous media servers, and read/write control information in a single shared control database 110 via Open Database Connectivity (ODBC) 120 or some similar standard database connectivity technology well known to those skilled in the art.

A Web-based Contributor Interface 130 enables video content administrators to catalog video entries, upload encoded video files, define video enabled Web sites, publish video content to video enabled Web sites, and share, copy, and transfer video metadata and video content.

Figure 4:
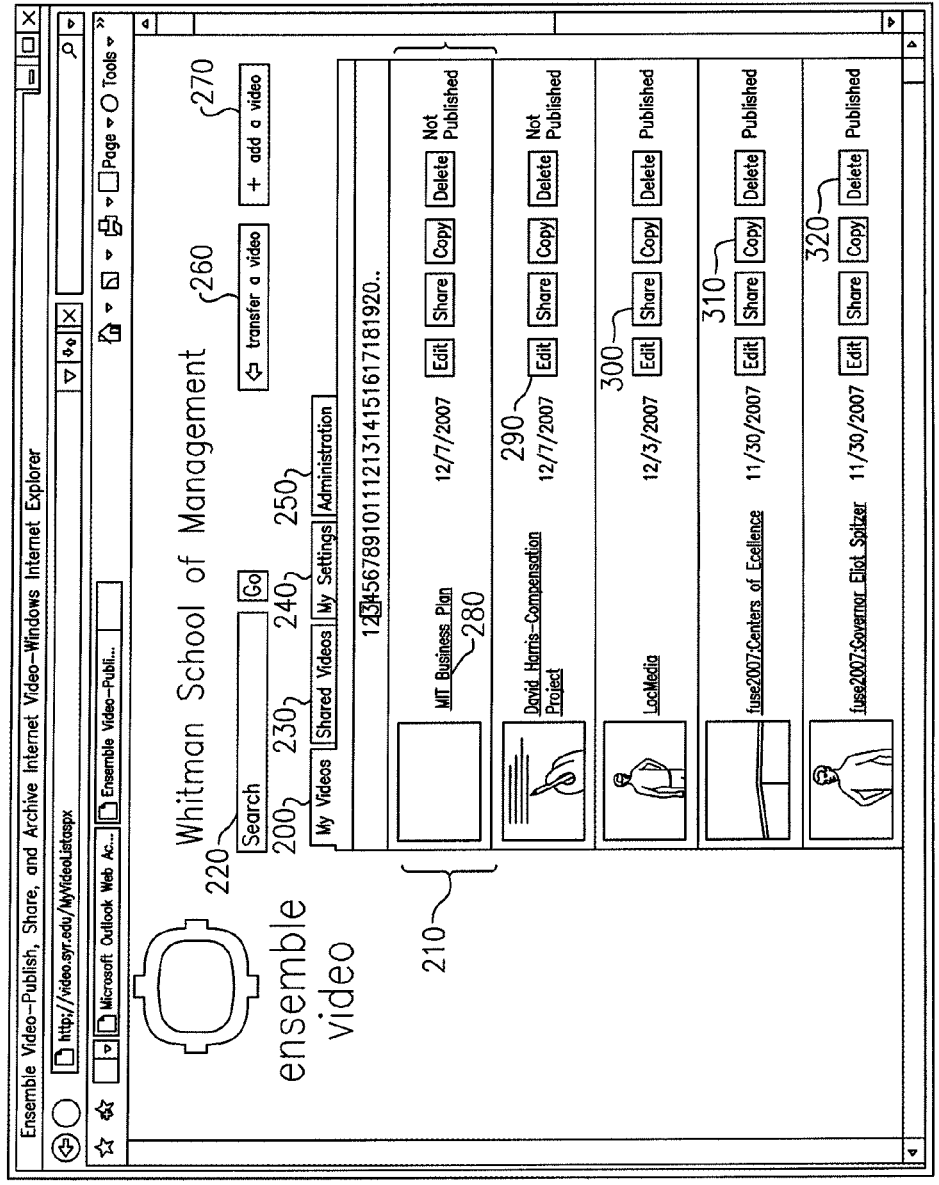
FIG. 4 is a screen shot from an embodiment of the present invention which shows the contributor interface where system administrators and content administrators log in to manage the system and manage video content.

As seen in FIG. 4, a screen shot of a contributor interface showing a departmental video edit listing is illustrated according to an embodiment of the present invention. This Figure illustrates a tabbed interface with a video edit listing tab, called "My Videos" 200, selected. FIG. 4 also shows an interface element comprising a single video title (also called a video entry 210); a search box 220 for searching the particular department's video library for video entries 210, a "Shared Videos" 230 tab for viewing a list of videos shared from other department content administrators running an embodiment of the present invention; a "My Settings" tab 240 for modifying password and user profile settings; an "Administration" tab 250 for accessing functions that content administrators use to configure and administer system settings, organizations, departments, users, and sharing settings; a "Transfer" button 260 which provide access to functionality for transferring video from one department to another; an "Add Video" button 270 for defining a new video title (video entry 210) and adding catalog information, uploading media, and specifying publishing on department Web sites and on Web sites of other departments (distributed Web-based video content publishing and viewer access 150, as shown in FIG.

2); a preview link 280 for each video title shown in the video edit listing which enables the content administrator to see what the entry will look like when its metadata and media links are embedded on a Web site for viewers (distributed Web-based video content publishing and viewer access 150, as shown in FIG. 2); an "Edit" button 290 for accessing the video entry edit wizard for editing metadata, and sharing and publishing the video entry; a "Share" button 300 which takes the content administrator directly to the portion of the video entry edit wizard where video entry publishing and sharing is specified; a "Copy" button 310 which leads to functions enabling content administrator to specify that a particular video entry 210 will be copied to another department's video edit listing (with media copies optionally copied to the department media store of the target department); and a "Delete" button 320 for deleting the video entry 210 from the "My Videos" video edit listing 200.

The system provided enables content administrators to upload media via the Web application 100 (through interaction with the contributor interface 130), such that the Web application 100 can transfer uploaded media to any of a number of remote media repositories 140. This creates independence between the Web application video metadata management/publishing functions and the storage and on-demand delivery of video content. It also enables the Web application 100 to manage—move, copy, and delete—video files across this infrastructure of local and network accessible media servers (distributed media storage and access 140). This functionality also underlies the ability of the system to copy and transfer video entries with associated media between organizations and departments.

Figure 5:
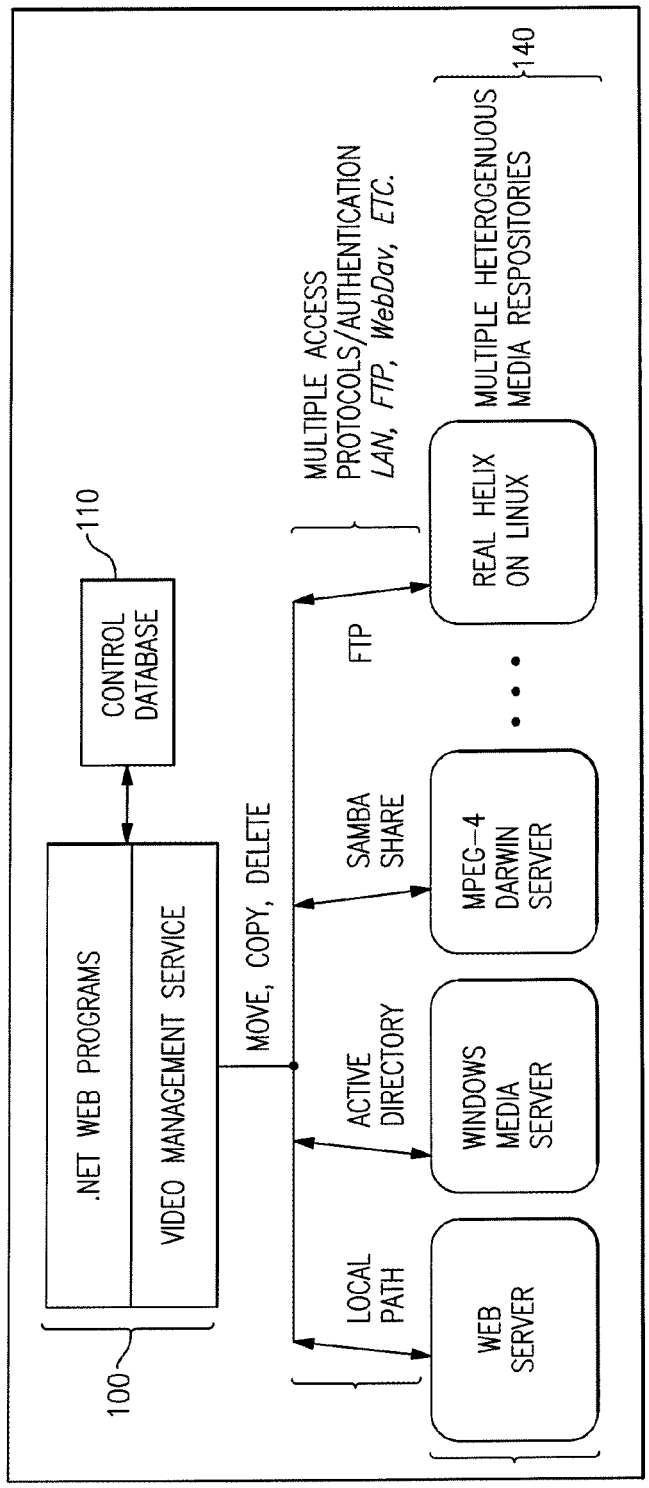
FIG. 5 is a diagram that shows how the video management service component of the Web application moves, copies, and deletes video files across an heterogeneous infrastructure of local, LAN, WAN, and Internet accessible media servers, according to an embodiment of the present invention.

The Web application 100 comprises a video management service component. As seen in FIG. 5, some of the specific access protocols and authentication mechanisms used by the video management service component of the Web application 100, are illustrated according to an embodiment of the present invention. When a new video entry is created, one or more encoded video files are uploaded to a Web server running the Web Application 100 (.NET Web Programs in an embodiment of the present invention) via the Contributor Interface 130 to a local Web Application 100 Upload directory. Those files are then moved by the video management service to any one of a number of heterogeneous media storage repositories 140 including Web or streaming media directories on a local storage device (e.g., c:\inetput\wwwroot\media), LAN accessible media or Web servers, or Internet accessible media servers or Web servers. These locations are accessible via any number of network protocols and authentication mechanisms (a representative sampling are shown in FIG. 5). The .NET Web Programs can submit requests in the control database for the video management service to move video file(s) (transfer a complete copy of a video file from one location to another across any accessible location in the multiple heterogeneous media repositories 140 so that the file in the original location is deleted once it is transferred), copy video file(s) (transfer a complete copy of a video file from one location to another across any accessible location in the multiple heterogeneous media repositories 140 so that complete video file is retained in its original location and in the destination location) or delete a video file (delete a file from any accessible location across multiple heterogeneous media repositories 140).

The video management service can also be configured to move or copy files from one location to another during periods of low bandwidth utilization (for example early morning hours). And the system can be used to "poll" a media storage directory on a predetermined polling time interval for new video content which is automatically added to a department video edit listing in the contributor interface of an embodiment of the present invention. Optionally, the video management service can be configured to synchronize deletion in the Web application so that when a video entry is deleted in the video edit listing, each video encoding associated with that video entry is also deleted from the media server where it resides.

Content administrators can also create video titles where they manually enter meta-data documenting video media that is not accessible in the media storage servers accessible to the system. This is useful for adding external video titles to the video library so it can be published and shared alongside video content that is managed and accessible by the system.

Figure 6:
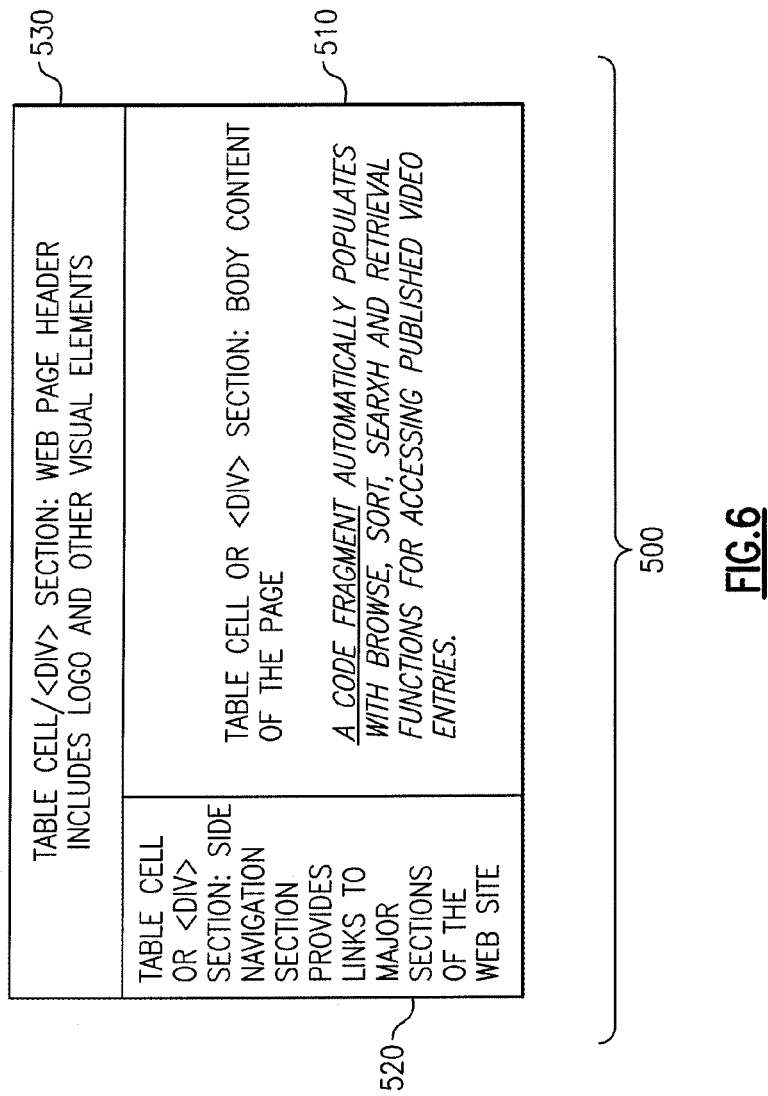
FIG. 6 is a table illustrating a template web page according to an embodiment of the present invention, showing how departmental Web pages are configured to combine branding and navigation with body content, and how an embodiment of the present invention provides dynamic insertion of video access content in a Web page.

On most Web sites, a template Web page 500 with navigation and customized graphic content is typically used to provide a consistent "look and feel" and brand content across the Web site. To embed video entry search, browse, and access in Web pages (this is known as "publishing" video content in an embodiment of the present invention) that are distributed across Web sites and Web servers, a code fragment is assigned to the body 510 of a template Web page 500 (as shown in FIG. 6). The code fragment retrieves video entry metadata and formats it for display on the page. It also provides video search, sort, and other basic functions for retrieving and viewing video content. This code fragment for embedding video content can be based on some combination of HTML, XML and programming tools such as .NET, PHP, Ajax, Coldfusion, and the like. A table cell or HTML <div> side navigation section 520 and a table cell or HTML <div> graphical branding section 530 are also shown.

As seen in FIG. 7, a sample code fragment is illustrated according to an embodiment of the present invention. This code fragment connects to Web server content management software (Web application 100—not shown) of an embodiment of the present invention. A WebID in the control database 110 identifies which metadata is to be retrieved by the Web Application 100 and transmitted to the code fragment 510 in a Web site where video content is to be published.

In an embodiment of the present invention, the code fragment 510 provides not only content but links and Web-forms that enable interaction with the end user. It also dynamically retrieves information from the control database 110 via the Web application 100. Thus, the code fragment provides interactive functionality within the Web page, including: listing a summary of video titles in a browse format with a thumbnail still frame image for each video, showing video categories with a summary of recent videos added to each category with a thumbnail image of summarized videos, displaying information and thumbnail images for a featured video and several new videos, a video entry search capability, an ability to browse a summary of videos (with thumbnail images) by category, and a function for viewing detail pages for individual video entries where there is an animated preview image generated from video still images along with catalog information and media links (so the media can be viewed).

Figure 8:
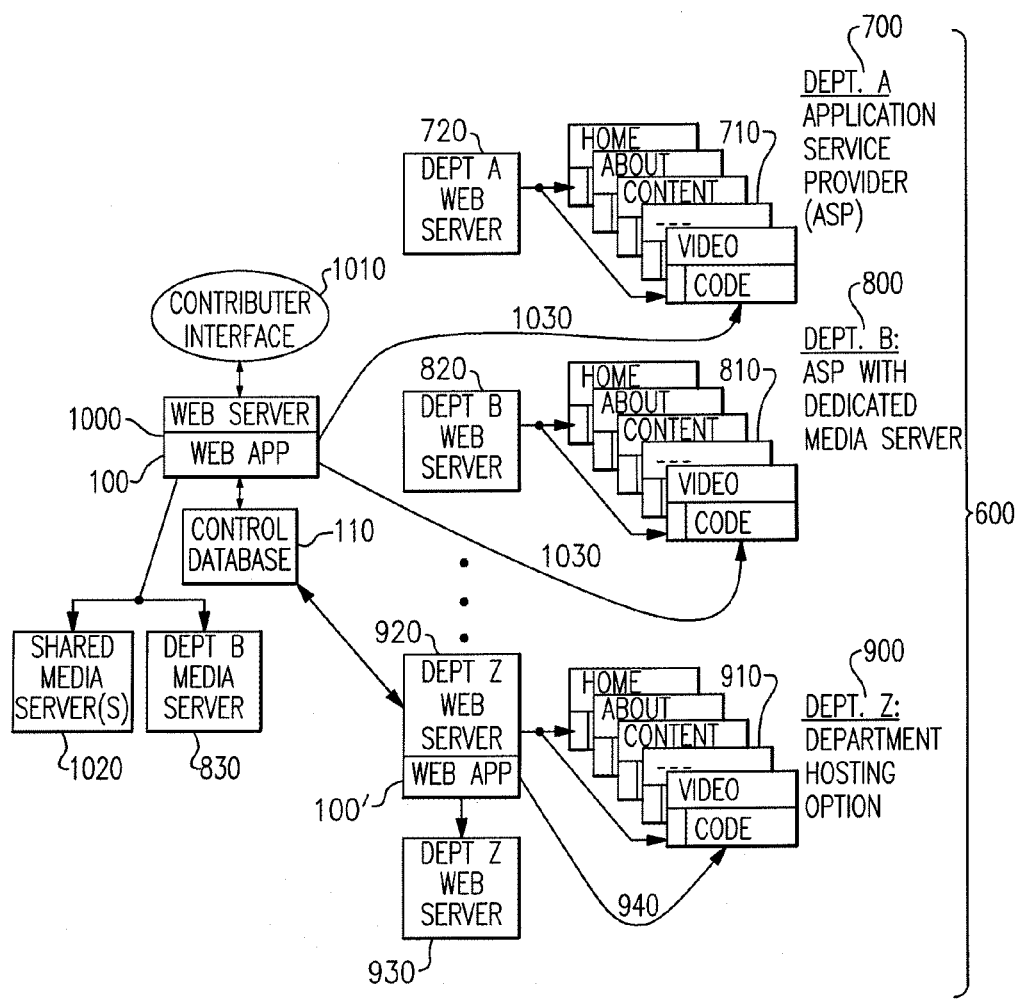
FIG. 8 is a diagram illustrating a system comprising a single organization, with a single control database and multiple departments according to an embodiment of the present invention, showing how the system can support distributed Web server video content management software, distributed media hosting, and distributed end-user Web page access.

As seen in FIG. 8, a diagram illustrating a system comprising a single organization 600 which has a single dedicated control database 110 and multiple departments is provided, according to an embodiment of the present invention. This implementation of the system shows how the system can support distributed publishing, video metadata and content sharing, and distributed video content storage and streaming.

Department A 700 maintains a Web site comprised of several Web pages 710, where some of the Web pages 710 have embedded managed content related to stored video entries. Department A 700 has its own Web server 720. Embedded video content metadata, media links, and interactive functionality on Department A Web pages 710, however, are implemented with code fragments 510. The code fragments 510 dynamically retrieve and format HTML content 1030 from the Web application 100 on shared Web server 1000 based on information in the shared control database 110. The code fragment 510 embedded on each Web page 710 where video content is published retrieves and formats HTML content 1030 from the Web Application 100 based a unique Web ID that is also stored in the shared control database 110. There is a separate Web ID for each video Web site 710 defined within an embodiment of the present invention where content is to be published. Department A 700 (via a Department A 700 content administrator) can also upload video files to a shared organizational media storage and streaming infrastructure ("shared media server(s)") 1020, through contributor interface 1010.

Department B 800, like Department A 700, uses a shared organizational implementation of the Web-based content management software 100 of an embodiment of the present invention. Department B 800, as shown in FIG. 8, illustrates a department that uses a dedicated central departmental media server 830. Department B's Web server 820 and Web pages 810 are also shown. Web application 100 on Web server 1000 can be set up to transmit video files directly to the Department B media server 830 when uploaded through the Contributor Interface 1010 by a Department B content administrator, provided appropriate network access and protocols are in place. (See, e.g., FIG. 5—via Windows SMB share, Active Director, authenticated access, Samba share to Linux or Unix server, ftp, sftp, proprietary UDP transfer mechanisms, and other protocols and copy mechanisms—available across LAN, MAN, WAN, or the Internet—suitable for the transmission of large video files.).

Embedded video content metadata, media links, and interactive functionality on Department B Web pages 810 are implemented with code fragments 510 that dynamically retrieve and format HTML content 1030 from Web application 100 on shared Web server 1000 based on information in the shared control database 110. As with Department A 700, the code fragment 510 embedded on each Web page 810 is based on a unique Web ID that is stored in the shared control database 110.

Also, as seen in FIG. 8, Department Z 900 is shown which hosts its own Web server 920 and its own local departmental media server 930. Department Z 900 runs its own version of the video content management software 100' on its Web server 920. This implementation of the software can upload and transfer video files directly to the local department video media server 930. The software is connected to the shared organizational control database 110, which enables Department Z 900 to share video content with other departments in the organization. Embedded video content metadata, media links, and interactive functionality on Department Z Web pages 910 are implemented with code fragments 510 that dynamically retrieve and format HTML content 940 from Web application 100' which retrieves parameters from the shared control database 110) on department Z Web server 920 based on a unique Web ID that is stored in the shared control database 110.

Figure 9:
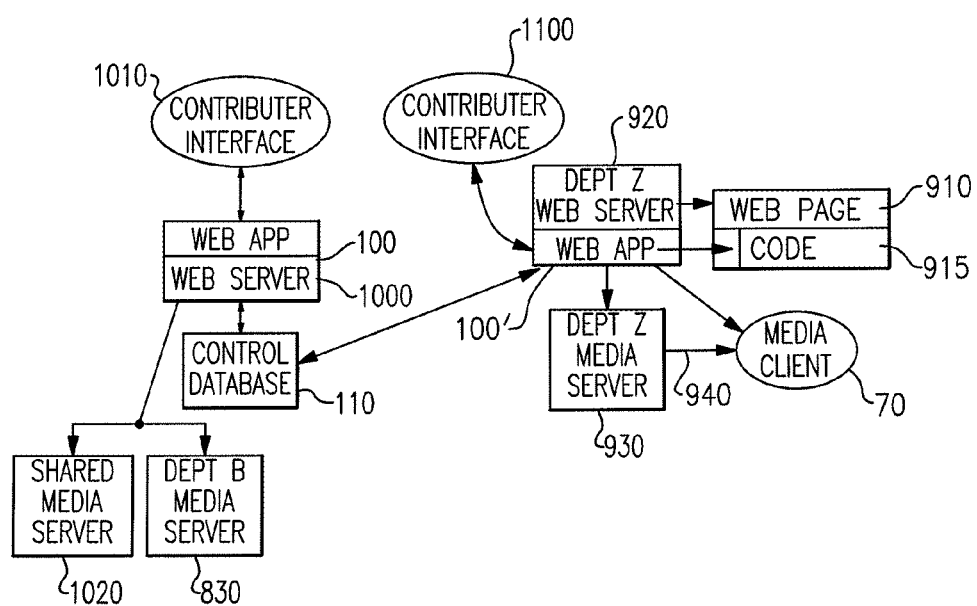
FIG. 9 is a schematic diagram illustrating an embodiment of the present invention, which shows a more detailed view of the distributed video content management implementation of Department Z as shown in FIG. 8.

FIG. 9 is a schematic diagram illustrating an embodiment of the present invention, which provides a more detailed view of the Department Z 900 set up, seen in FIG. 8. The Department Z Web server 920 runs a copy of the video content management system software (Web application 100'), which provides a separate Contributor Interface 1100 (not shown in FIG. 8). This instantiation of the software 100' is configured to upload and transmit video media files directly to the Department Z media server 930. The software 100' is also configured to manage all meta-data on a shared organizational control database server 110, so that video content can be shared with other departments in the organization. The Web pages 910 managed by the Department Z Web server 920 include some pages with embedded video content metadata, media links, and interactive functionality. Those pages are serviced by code fragments 510 that dynamically retrieve and format HTML, content 940 from the Department Z Web-based content management software 100' that runs on the departmental Web server 920.

The video content management, access, and sharing that is depicted in FIG. 8, shows an implementation in a large organization with multiple departments. For example, this could be a large corporation, university, or government agency. But the present invention is by no means restricted to those contexts. The use of the terms "organization" and "department" in the system serve as place holders for any conceivable use of this technology to organize video content management across a mix of individuals, groups of individuals, organizations, or communities. The term "organization" could serve to define a consortium of educational institutions, a group of local government agencies, a network of individual content creators, and the like.

Figure 15:
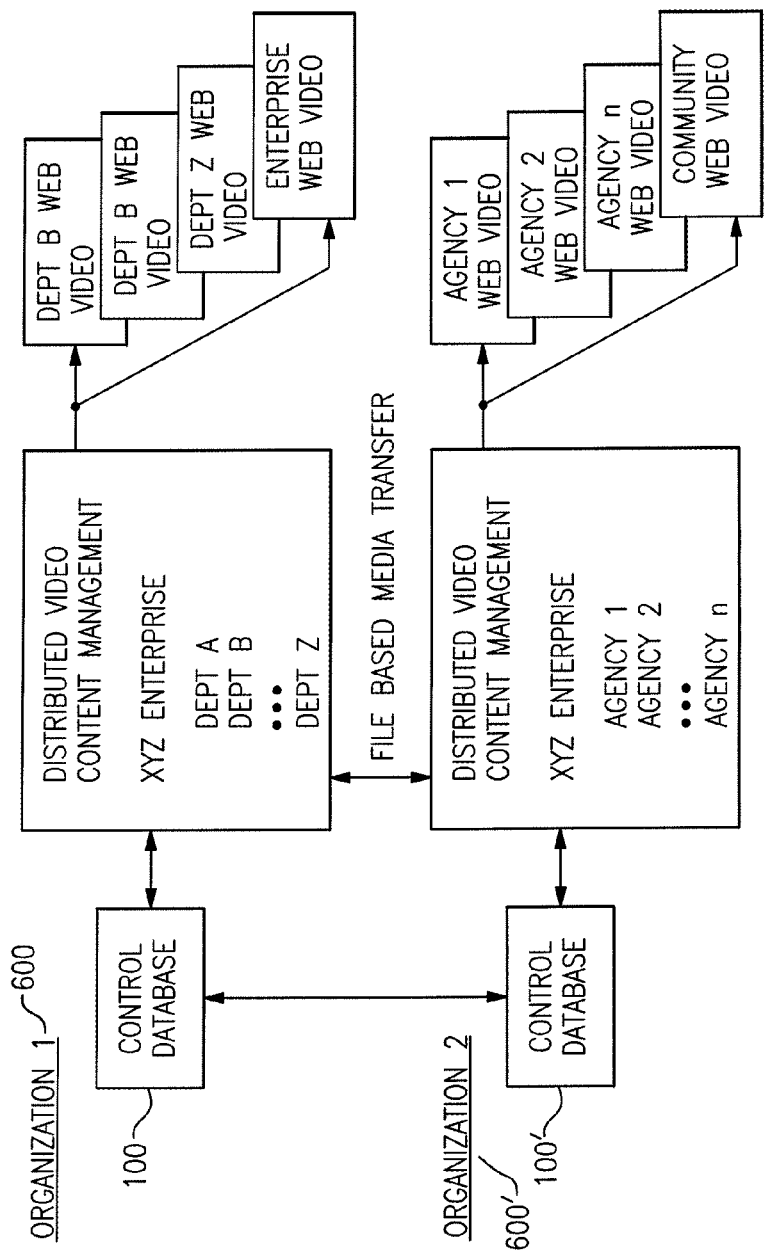
FIG. 15 is a diagram illustrating an embodiment of the present invention, which shows how multiple organizations can share access to video content across multiple organizations each of which have dedicated control databases.

As discussed further infra with reference to FIG. 15, a plurality of organizations and departments with disparate control databases can also be integrated, through database mirroring or replication, or a file-based process to enable video content sharing across "organizations".

Every department has one or more content administrators including department-contributors with contribute permissions and department-editors with edit permissions. Department-Contributors can create, edit, and delete video entries, and publish the video entries to any departmental Web site; and Department-Editors can edit existing video entries owned by the department and publish them to departmental Web sites.

Sharing capabilities are managed through a set of permissions, including Contribute and Edit permissions (as noted above regarding department-contributors and department-editors); Copy and Transfer permissions; and Share, Publish permissions. These permissions are provided to a source department's content administrators.

Content administrators for a department (receiving department) have the option of allowing content administrators from another department (source department) to Copy an existing video entry to the receiving department so it can be edited, shared, and published by the receiving department. Granting Copy permission to source department content administrators by a receiving department content administrator is illustrated in FIG. 10 Viewing/Modifying department share permissions 1200. The content contributors from a source department, have access to a Copy button in the video edit listing of the Contributor Interface, as illustrated in FIG. 4. This copy button leads to an interface where the source department content contributors can choose the receiving department. The source department content contributors may click on a Copy button for the video entry, and may indicate whether the media should also be copied. All existing metadata is copied into a new video entry for the receiving department, and the receiving department obtains full edit, sharing, and publishing control over the new entry.

Content administrators from a source department which are granted Transfer permission have the option of creating and transferring video content entries to a receiving department's control. Granting Transfer permission to source department content administrators by a receiving department content administrator is illustrated in FIG. 10 Viewing/Modifying department share permissions 1200. This is useful for instances where a single department, such as a video production unit, routinely creates content for other departments. Content administrators from the source department have access to a Transfer mechanism in the Contributor Interface, as illustrated in FIG. 4, which leads to an interface where the source department content contributors can create a new video entry which is immediately transferred to the receiving department. For example, the source department content administrator may choose the department he or she wishes to Transfer video content to from a drop-down menu in the interface. The interface enables the source department content administrator to then add some basic catalog information and upload encoded media files. The media files are uploaded to a directory in the distributed media storage repository 140 (see, e.g., FIG. 2) set up for the receiving department. A new video entry is created for the receiving department based on the meta-data entered and gathered during this process. The source department does not have access to the video entry upon completing the transfer.

As seen in FIG. 10, interface elements for content administrators to specify and manage content sharing (i.e., Share, Transfer, and Copy) and direct publishing among and between organizations and departments is provided, according to an embodiment of the present invention.

FIG. 10 includes an interface for creating or deleting a "share" 1200, which is an authorization for another department (source department) to share content with the department (receiving department) which has an associated logged-in content administrator. This share interface 1200 is also used to grant Transfer or Copy permissions for departments that have been given Share permission.

FIG. 10 also shows the interface element where a content administrator selects a department for Share permission 1210. This is the interface that is displayed when a content administrator clicks on the "Add a New Share" button in 1200.

FIG. 10 also shows the interface for authorizing another department, who has been granted "Share" permission, the ability to publish directly to a department Web site 1220.

Interface elements 1230 and 1240 show example check-boxes that would appear in the Add/Edit wizard for a source department content administrator (accessible from 270, 290, and 300 in "My Videos" 200 video edit listing shown in FIG. 4) when granted share permission only (1230) and share permission with direct publishing (1240) respectively.

Department Share permissions enable a source department's content administrators to share video content entries with a receiving department so that they can be published by the receiving department. These permissions are assigned by a receiving department to a source department as shown in FIG. 10—Granting department share permissions 1210. A content administrator in a source department that wishes to share an existing video entry, can share with the receiving department by clicking on a check-box on a Sharing form in the contributor interface indicating a department share. Then the receiving department sees the video when viewing the "Shared Videos" tab 230 in the contributor interface (see FIG. 4), and the receiving department's content administrator can click on one or more Web sites where they wish to publish the video entry.

A given receiving department may also authorize Publish permissions to a source department's content administrators (as shown in FIG. 10, Authorizing direct publishing 1220) that have been granted Share permission. This enables a receiving department's contributing content administrator to specify end-user access to video content entries directly on one or more receiving department Web sites. For example, content administrators may publish a video content entry on a Web site through a Sharing form in the contributor interface. For a single video content entry, a content administrator can simply click on check-boxes to identify which Web sites a video content entry will be available on. The code for the Web sites dynamically displays video content entries.

FIG. 11 is a table illustrating an embodiment of the present invention, which shows departmental content administrator Share permissions and Web site Publish permissions. For example, Dept. A owns Web site 1, Web site 2, and Web site 3. This department has default permissions, which enable Dept-A-Contributors to create, edit and delete departmental video entries, Dept-A-Editors to edit departmental video entries, and Dept-A-Contributors and Dept-A-Editors to publish video entries on any departmental Web sites. Dept. B owns Web site 4, Web site 5, and Web site 6. This department has modified default permissions by allowing Dept-A-Contributors to share content at the departmental level only (they cannot publish directly to any of Dept B's Web sites). Dept Z, which owns Web site 7, Web site 8, and Web site 9, has modified default permissions by: removing the ability of Dept-Z-Editors to publish video entries on Web site 8 and Web site 9; allowing Dept-A-Contributors to share video entries; allowing Dept-A-Contributors to publish shared video entries directly to Web site 8 or Web site 9; and allowing Dept-B-Contributors to share and publish video content entries to Web site 9.

The permissions illustrated in FIG. 11 constitute a specification that determines where and how a given content administrator can create, edit, share, and publish content entries. Sharing and direct publishing is accomplished by the source department content administrator in the Contributor Interface sharing section through a check boxes on a Web form in the Sharing section of the Add/Edit Wizard (as illustrated in FIGS. 10, 1230 and 1240).

FIG. 12 is a table illustrating an embodiment of the present invention, which shows the department and Web site check boxes that would be available to Dept-A-Contributors, Dept-B-Contributors, and Dept-Z-Contributors. FIG. 12 illustrates how the rights described above and illustrated in FIG. 11 translate within the Contributor Interface to checkboxes that are available to content contributors.

FIG. 13 is a table illustrating an embodiment of the present invention, which shows the department and Web site check boxes that would be available to Dept-A-Editors, Dept-B-Editors, and Dept-Z-Editors. FIG. 13 illustrates how the rights described above and illustrated in FIG. 11 will appear to department content editors.

Department content contributors can authorize Share permission to any other department's content contributors and content editors from which it wishes to receive shared video content entries; and department content contributors can assign Web site Publish permissions to any other department's content contributors and content editors which have also been granted Share permissions, for any Web site(s) owned by the department. Assigning Share and Publish permissions to another department is as illustrated in FIG. 10, 1210 and 1220.

Video entry viewing capabilities (or access) are also managed through a set of permissions. FIG. 14 is a table illustrating an embodiment of the present invention, which details the viewing permissions that content contributors and content editors can assign to Public, a department user group, or any other user group for each video entry they publish to a Web site of an embodiment of the present invention. This enables content administrators to control individual users or user group access to video entries. The content administrators can completely hide video entries from Public or other user groups (viewers see no evidence that the entry exists). The content administrators can also provide Public or other user groups with partial access to the video entries via a Read permission (viewers can see the information/meta-data about the video entry but cannot view the video media), or enable full access to the video entries via an Execute permission.

FIG. 15 is a table illustrating an embodiment of the present invention, which shows how multiple organizational implementations can be integrated via database mirroring or replication, so that departments can share video entries between departments and organizations that have disparate control databases. Mirroring, is a well known technique to those skilled in the art (but has not been used in the following way), is one method that can be used to provide an exact copy of the control database across the two implementations.

With replication, selected control database tables are copied from one database to another on a scheduled basis. All video metadata elements in the system provided are based on Global Unique Identifiers (GUIDs) as Primary Keys for video metadata records. These GUIDs are guaranteed unique through space and time. Since these fields are absolutely unique and will never be duplicated between installations with disparate control databases, they can be used to replicate metadata between installations with disparate control databases. When a sharing relationship is setup between two installations with disparate control databases, the following table data is transferred from the SOURCE installation to the DESTINATION installation (or between both, assuming there is a two way setup): Organizations and associated meta data; Departments and associated meta data; Videos and associated meta data; Websites and associated meta data; Categories and associated meta data; Encodings and associated meta data, etc.

Figure 16:
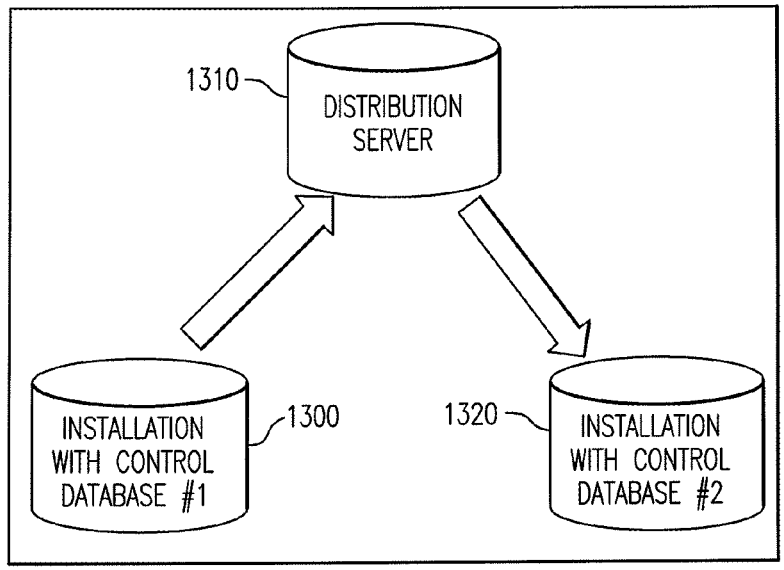
FIG. 16 is a diagram illustrating how database replication can be used to enable metadata and content sharing between departments and organizations which have separate installations of the Web application software with disparate control databases.

FIG. 16 illustrates a mechanism based on replication for video metadata and content sharing between installations with disparate control databases. Installation with Control Database #1 1300 has External Organization information stored in the local database. This allows content administrators to share or publish video contents to external partner sites. Installation with Control Database #1 1300 will replicate video metadata (and optionally transfer video file(s)) to Distribution server 1310. Installation with Control Database #2 1320 will check Distribution server 1310 for any metadata changes for Installation with Control Database #2 1320 based on GUID. If new records are found, the Installation with Control Database #2 1320 will download the video metadata (and optionally transfer video files if the video was published).

The process can be reversed assuming that a two-way relationship is set up between both Installation with Control Database #1 1300 and Installation with Control Database #2 1320. However, this is not required. One-way is useful for corporate or private installations that want to share videos with a "public" or community installation of an embodiment of the present invention. The two-way replication is ideal for video sharing partnerships between businesses, schools, etc.

An import/export function provides for file-based video metadata and content sharing. Each system is equipped with software components which can write XML-based meta-data files and video files to a directory. That data can be transferred to the target installation and imported so that the metadata is added to the target control database and the video media is copied into the appropriate media storage servers.

While FIG. 15 shows two integrated organizations 600/600', it is possible to integrate any number of organizations using database replication, mirroring and/or file-based transfer techniques.

Figure 17:
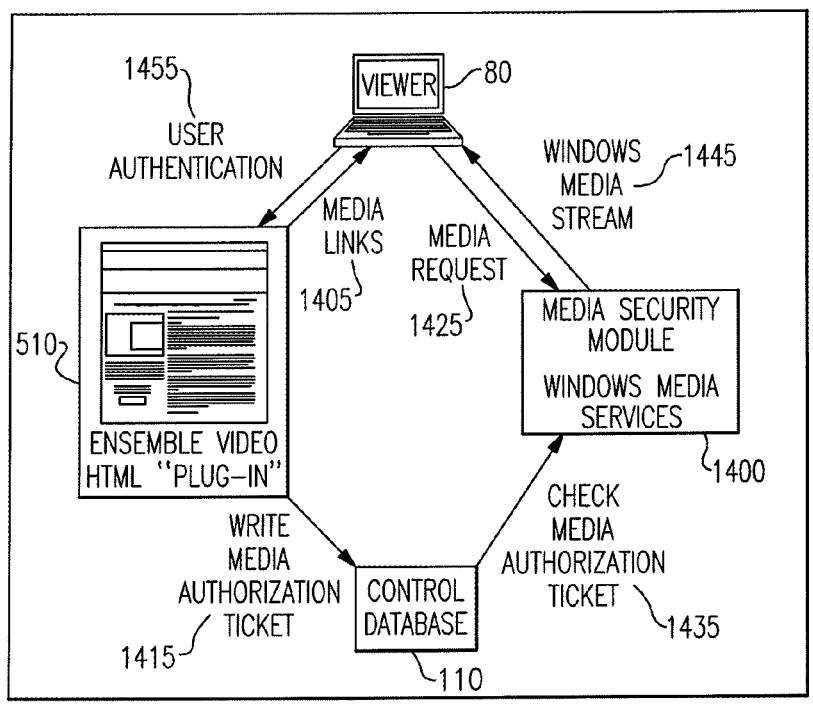
FIG. 17 is a schematic diagram illustrating a system implementing security architecture and mechanisms, according to an embodiment of the present invention.

Turning to FIG. 17, a schematic diagram illustrating a system implementing security architecture and mechanisms is shown, according to an embodiment of the present invention. Such architecture/mechanisms include user authentication and a media security module.

User authentication 1455 for Web access to video metadata and video media links can be handled via any standard Web page security mechanisms, for example, where a Web server is already tied to organizational Lightweight Directory Access Protocol ("LDAP"), Active Directory, or other identity management solutions. A user and group viewer authentication mechanism is also provided in the Web software (not shown) which is consistent with those well known to those skilled in the art. A standard LDAP security mechanism can be integrated into the Web software security architecture, so that organizations may use the system and implement content administrator and viewer authentication using an enterprise LDAP repository.

A system implementing a media security module 1400 is also illustrated, which affords streaming security based on an authorization ticket written to a control database 110 from a Web-plugin 1410 or other Web publishing (meta-data content) mechanism. This media security module 1400 can be used with various media servers including Windows Media servers and the like. Access to various media server content can be controlled through this media security module 1400. When the media security module 800 is implemented, an embedded code fragment 510 (referred to in FIG. 17 as an HTML "plugin") writes an "authorization ticket" 1415 to a control database 110 every time a page of media links 1405 is generated and transmitted to a viewer 80. This "authorization ticket" is a set of variables written to the control database 110 that may include: media files included in the links on the viewer access page, the IP address of the requesting viewer, and the length of time that this IP address can access the media files indicated in the "authorization ticket." When the media security module 1400 receives a media request 1425, it checks the media authorization ticket 1435 in the control database 110 to verify if the requesting IP address has been authorized to view the media file. The media security module 1400 will only stream the content 1445 if a valid authorization is available. If any of the variables—IP address, media file, and time to live—are not valid, the media security module returns "401 Access Denied" to the user's media player.

Additional variables for the authorization ticket may be specified to further extend content security. For example: an IP address range of authorized viewer IP addresses to limit viewer access; the IP address of the Web server where the content was embedded (to prevent embedding the content on other Web servers that would enable un-authorized viewer access), the Uniform Resource Locator for the Web site where the video content is published (to prevent embedding the content on any other Web pages, including those on the same server, that would enable un-authorized viewer access).

The media security module 1400 ensures that only authorized users/viewers can view video media content. If an authorized user copies a media link and emails it to a friend, for example, that user will be denied access because a proper authorization ticket for that user would not exist in the control database 110. With the media security module 1400, organizations can choose to secure viewer content pages with any number of Web page security mechanisms (e.g., Web server security, course management system security, or particular users and user groups) and know that only viewers with access to secure pages will be able to stream the protected video media managed content.

A system administrator controls the settings across the implementation on one or more sets of Web-based systems and media servers that are integrated with a single shared control database 110. Access to system administrator functions in an embodiment of the current invention for configuring network paths (a directory on one of the multiple heterogeneous media stores 140), configuring an authorization source, such as an LDAP server (for user authentication) creating new organizations and departments, and creating new users and groups, is provided through the "Administration" tab 250 as shown in FIG. 4.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

The invention claimed is:

1. A media content management system comprising:
   a plurality of remote Web servers interconnected to a network, each of said plurality of remote Web servers maintains a Web site comprising at least one Web page;
   a plurality of dedicated hardware heterogeneous network-based media servers interconnected to the network, wherein each of said plurality of dedicated heterogeneous media servers includes a plurality of media files comprising at least an audio or a video file, each of said plurality of media files on each of said plurality of dedicated heterogeneous media servers is administered by a department through a departmental content administrator, wherein at least one of said dedicated heterogeneous media servers is configured to run a different media server software, support a different type of media format, or use a different media delivery network protocol from the other ones of a plurality of dedicated heterogeneous media servers;
   only one single control database interconnected to the network, wherein said control database includes a separate set of data parameters for each of said plurality of media files on each of said dedicated heterogeneous media servers, wherein no separate set of data parameters is associated with more than one media file, comprising at least a first and second data parameter, wherein said first data parameter comprises separate media file meta-data content for each of said plurality of media files on each of said dedicated heterogeneous media servers, and wherein said second data parameter indicates which of said departmental content administrators has a permission associated with which of said plurality of media files on which of each of said dedicated heterogeneous media servers and with said associated media file meta-data content, wherein each of said departmental content administrators has a permission associated with each of said plurality of media files and with said associated media file meta-data content on said dedicated heterogeneous media servers that said content administrator administers, wherein at least one of said content administrators has a permission associated with at least one of said plurality of media files and with said associated media file meta-data content on at least one other dedicated heterogeneous media server, wherein each of said permissions comprises a share permission indicating which of said departmental content administrators is authorized to share which of said media files on which of said dedicated heterogeneous media servers and said associated media file meta-data content with which of said other departmental content administrators, and wherein each of said permissions comprises a publish permission indicating which of said departmental content administrators with a share permission is authorized to provide access to which of said associated media file meta-data content on which of said at least one Web page;
   a shared central Web server interconnected to at least one of said plurality of said dedicated heterogeneous media servers and to said control database comprising Web application software, wherein said Web application software is adapted to implement at least one of said plurality of data parameters associated with each of said plurality of media files on said at least one of said plurality of said dedicated heterogeneous media servers; and
   a user interface interconnected to said one of said remote Web servers adapted to receive information defining said at least one of said separate set of data parameters associated with at least one of said plurality of media files on said at least one of said plurality of dedicated heterogeneous media servers.

2. The media content management system of claim 1, wherein said one of said plurality of remote Web servers comprises Web application software, wherein said Web application software of said one of said plurality of remote Web servers is adapted to implement at least one of said plurality of data parameters associated with each of said plurality of media files on at least one of said dedicated heterogeneous media servers.

3. The media content management system of claim 1, further comprising a user interface interconnected to the shared central Web server adapted to receive information defining said at least one of said plurality of data parameters associated with at least one of said plurality of media files on said at least one of said plurality of dedicated heterogeneous media servers.

4. The media content management system of claim 1, wherein each of said permissions further comprises a publish permission indicating which of said departmental content administrators with a share permission is authorized to provide access to which of said media files on which of said dedicated heterogeneous media servers and said associated media file meta-data content on which of said at least one Web page.

5. The media content management system of claim 2, wherein each of said permissions comprises a copy permission indicating which of said departmental content administrators is authorized to obtain control of a copy of which of said media files on which of said dedicated heterogeneous media servers and said associated media file meta-data content.

6. The media content management system of claim 2, wherein each of said permissions comprises a transfer permission indicating which of said departmental content administrators is authorized to obtain control of which of said media files on which of said dedicated heterogeneous media servers and said associated media file meta-data content.

7. The media content management system of claim 1, further comprising at least one Web browser connected to the network, wherein said control database further includes a third data parameter associated with at least one of said plurality of media files on at least one of said dedicated heterogeneous media servers, wherein said third data parameter indicates which of said at least one Web browser has a permission associated with which of said plurality of said media files on which of said dedicated heterogeneous media servers and with said associated media file meta data content, and wherein said Web application software of said one of said remote Web servers is adapted to implement said third data parameter associated with at least one of said plurality of media files on said at least one of said dedicated heterogeneous media servers.

8. The media content management system of claim 7, wherein said third parameter permission comprises a read permission indicating which of said at least one Web browser is authorized to have access to which of said associated media file meta-data content.

9. The media content management system of claim 7, wherein said third parameter permission comprises an execute permission indicating which of said at least one Web browser is authorized to have access to which of said media files on which of said dedicated heterogeneous media servers and said associated media file meta-data content.

10. The media content management system of claim 1, wherein said control database further includes a third data parameter, wherein said third data parameter indicates control information associated with each of said plurality of media files on each of said plurality of dedicated heterogeneous media servers, wherein said control information comprises information selected from the group consisting of moving at least one of said plurality of media files and said associated media file meta-data content between at least two of said plurality of dedicated heterogeneous media servers, copying said at least at least one of said plurality of media files and said associated media file meta-data content between at least two of said plurality of dedicated heterogeneous media servers, and deleting at least one of said plurality of media files and said associated media file meta-data content from said at least one of said plurality of dedicated heterogeneous media servers.

11. The media content management system of claim 1, wherein said Web application software is adapted to upload each of said plurality of media files onto at least one of said plurality of dedicated heterogeneous media servers.

12. The media content management system of claim 1, wherein each of said departments associated with each of said plurality of dedicated heterogeneous media servers exists within the same organization.

13. The media content management system of claim 1, wherein each of said departments associated with each of said plurality of dedicated heterogeneous media servers exists within a different organization.

14. The media content management system of claim 4, wherein said access to said media file meta-data content and to said media files is provided by a code fragment embedded on at least one web page.

15. The media content management system of claim 14, wherein said code fragment provides searchable and viewable access to said media file meta-data content and to said media files.

* * * * *